United States Patent [19]

Leyshon et al.

[11] Patent Number: 5,043,522

[45] Date of Patent: Aug. 27, 1991

[54] PRODUCTION OF OLEFINS FROM A MIXTURE OF CU+ OLEFINS AND PARAFFINS

[75] Inventors: David W. Leyshon; Glenn E. Cozzone, both of West Chester, Pa.

[73] Assignee: Arco Chemical Technology, Inc., Wilmington, Del.

[21] Appl. No.: 500,172

[22] Filed: Mar. 27, 1990

Related U.S. Application Data

[63] Continuation-in-part of Ser. No. 343,097, Apr. 25, 1989, abandoned.

[51] Int. Cl.$^5$ ................................................ C07C 4/02
[52] U.S. Cl. .................................... 585/651; 585/653; 208/120
[58] Field of Search ................. 585/651, 653; 208/120

[56] References Cited

U.S. PATENT DOCUMENTS

| | | | |
|---|---|---|---|
| 3,409,701 | 11/1968 | Noddings et al. | 585/653 |
| 3,761,538 | 9/1973 | Espino et al. | 585/653 |
| 4,054,510 | 10/1977 | Parker | 585/653 |
| 4,247,386 | 1/1981 | Capierre et al. | 208/61 |
| 4,251,348 | 2/1981 | O'Rear et al. | 585/653 |

FOREIGN PATENT DOCUMENTS

| | | | |
|---|---|---|---|
| 276206 | 12/1963 | Australia | 585/653 |
| 0109059 | 5/1984 | European Pat. Off. | 585/653 |
| 1911087 | 11/1969 | Fed. Rep. of Germany | 585/653 |
| 233584 | 3/1986 | Fed. Rep. of Germany | 585/653 |
| 178830 | 9/1985 | Japan | 585/653 |
| 0222428 | 11/1985 | Japan | 585/653 |
| 1002705 | 1/1986 | Japan | 585/653 |
| 964918 | 7/1964 | United Kingdom | 585/653 |
| 1397315 | 6/1975 | United Kingdom | 585/653 |

*Primary Examiner*—Patrick P. Garvin
*Assistant Examiner*—G. Fourson
*Attorney, Agent, or Firm*—William C. Long

[57] ABSTRACT

The present invention relates to the conversion of saturated paraffin hydrocarbons having 4 or more carbon atoms to olefins having fewer carbon atoms. In particular, the invention provides for contact of a mixture of 40 to 95 wt % paraffin hydrocarbons having 4 or more carbon atoms and 5 to 60 wt % olefins having 4 or more carbon atoms with solid zeolitic catalyst such as ZSM-5 at conditions effective to form propylene and the separation of light olefins from the reaction mixture.

4 Claims, 1 Drawing Sheet

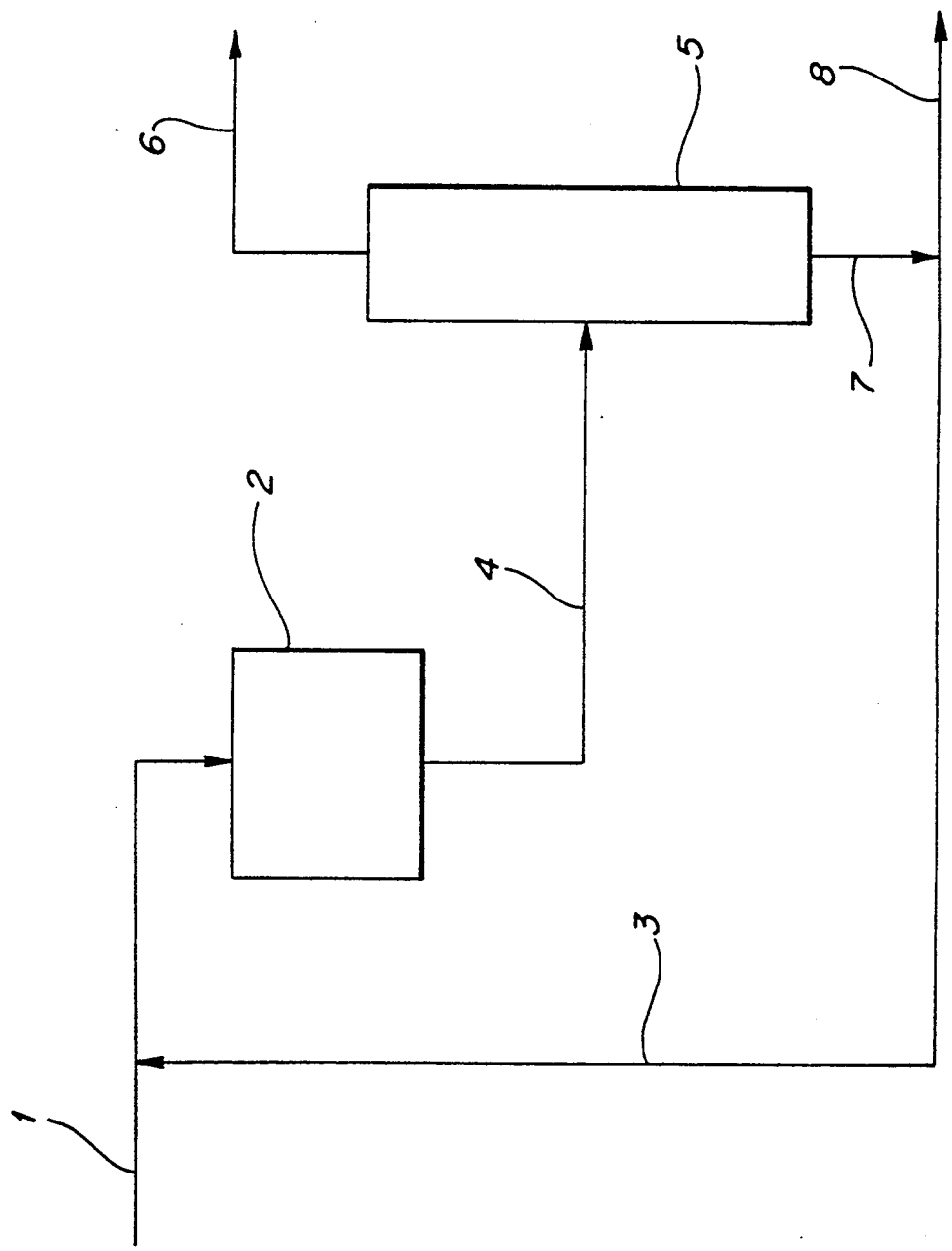

PRODUCTION OF OLEFINS FROM A MIXTURE OF CU+ OLEFINS AND PARAFFINS

BACKGROUND OF THE INVENTION

1. Related Applications

This application is a continuation-in-part of copending application Ser. No. 07/343,097 filed Apr. 25, 1989 now abandoned.

2. FIELD OF THE INVENTION

The present invention relates to the conversion of saturated paraffinic hydrocarbons to olefins having fewer carbon atoms. In particular, the invention provides for contact of a mixture of saturated and unsaturated hydrocarbons comprised of 40% to 95% saturated hydrocarbons with solid zeolitic catalyst such as ZSM-5 at conditions effective to form propylene. In preferred practice, light olefins are separated from the reaction mixture, and unreacted saturated feed and product olefin other than the desired light olefins product are recycled for further reactive contact over the zeolite catalyst.

3. Description of the Prior Art

Methods are currently known for the production of commercially important olefins such as propylene from paraffinic feed materials. Such methods include steam cracking, propane dehydrogenation, and various refinery catalytic cracking operations.

Each of these procedures has certain disadvantages. For example, propylene yields from steam cracking are not very high, and are not substantially improved by recycling. Purification of non-propylene products is required which is costly or such products have only fuel value.

Propane dehydrogenation processes ar characterized by rapid catalyst coking requiring frequent, costly regenerations. Also, reasonable conversions require sub-atmospheric pressures, and propane is difficult to separate from propylene.

Propylene supplies from catalytic conversions are uncertain. Transportation and purification are significant problems.

SUMMARY OF THE INVENTION

The present invention provides an improved process for the selective production of propylene from $C_4$ and higher saturated paraffin hydrocarbon feed, especially $C_5$-$C_{20}$ paraffin. According to the invention, the saturated paraffin feed is combined with 5-60 wt. % of olefins having 4 to 20 carbon atoms and the mixture contacted with a zeolitic catalyst such as ZSM-5, at conditions which favor propylene formation, i.e. high temperature and low conversion per pass, and low hydrocarbon partial pressure. Preferably combined with the saturated feed hydrocarbon is a recycle stream containing unreacted feed as well as $C_4$+ olefins which are formed during the contact with the zeolitic catalyst and which are not the desired reaction product. Surprisingly, conditions which favor propylene formation from the saturated paraffin hydrocarbons also favor propylene formation from butenes and higher olefins, thus providing enhanced selectivity and yields through practice of the invention. It has been found that the provision of olefins in the feed mixture in the designated amounts results in a very substantial enhancement of saturated hydrocarbon conversion.

DESCRIPTION OF DRAWING

The attached drawing illustrates in schematic fashion preferred practice of the invention.

DETAILED DESCRIPTION OF THE INVENTION

Although it is known to convert paraffins to lower olefin-containing mixtures, as above described, prior procedures have not been entirely satisfactory. Yields via steam cracking are not high. Paraffins can be converted by reaction over acedic zeolites, but once again yields are not high.

In accordance with the invention, saturated hydrocarbon conversion to soluble light olefins can be dramatically improved by incorporated $C_4$ to $C_{20}$ olefins in the feed mixture and passing the resulting mixed feed over a zeolitic catalyst at conditions favoring propylene formation.

Saturated hydrocarbons employed as feed are paraffins having at least four carbon atoms and are preferably $C_5$ to $C_{20}$ paraffins. It is essential that the feed mixture to the conversion zone contain between 40 and 95 wt. % of these paraffins based on the total of paraffins and olefins for the advantages of the present invention to be realized.

Combined with the paraffins in the conversion feed mixture are $C_4$ to $C_{20}$ olefins in amount of 5 to 60 wt. % based on the total of paraffins and olefins, preferably 10 to 50 wt. % olefins.

The feed mixture may also contain aromatics, naphthenes and inerts such as nitrogen, but the benzene content should not exceed 30 wt. % of the total feed. At benzene concentrations above 40 wt. %, alkylation becomes significant and light olefin yields are reduced. The feed mixture may also contain steam in amount up to 30 mol. %, preferably 1 to 20 mol. %.

The accompanying drawing illustrates a particularly preferred practice of the invention involving recycle of $C_4$ and higher olefins formed during the paraffin conversion.

Referring to the drawing, the paraffin hydrocarbon feedstock, e.g., $C_6$-$C_{20}$ paraffin hydrocarbons, passes via line 1 to reaction zone 2. Recycle comprised of unreacted paraffins and $C_4$+ olefins passes via line 3 and is combined with the net paraffin feed to form a mixture of 40 to 95 wt. % paraffins, and this mixture is fed to zone 2. In zone 2 the mixed hydrocarbon feedstock is contacted with the zeolite solid contact catalyst at reaction conditions which favor production of propylene from both the paraffin and olefin feed materials.

Conditions favoring propylene production involve low hydrocarbon partial pressure, high temperatures and low per pass conversions as described later.

The product mixture from reaction zone 2 passes via line 4 to separation zone 5 wherein the components of the product mixture are separated by conventional means such as fractional distillation.

An overhead mixed ethylene and propylene stream is removed from zone 5 via line 6 and comprises the preferred product mixture. Higher boiling compounds are removed via line 7; a small purge of hydrocarbons suitable as gasoline blending stock is separated as by distillation (not shown) via line 8 with the remainder of the materials boiling higher than propylene being recycled via line 3 for further reaction in zone 2 after being combined with the fresh paraffin feed introduced via line 1."

In order to more clearly describe the invention particularly in comparison to procedures which are not in accordance with the invention, reference is made to the following examples.

COMPARATIVE EXAMPLE A

H ZSM-5, 20×40 mesh, in amount of 0.25 grams was admixed with 3.5 grams of similar mesh size alpha alumina and loaded into a 36 inch tubular reactor made from ⅜ inch OD tubing having 0.065 inch wall thickness. Reactor heating was by an electric tube furnace.

Normal octane was fed to the top of the reactor where it was preheated to 510° C. before contacting the catalyst. Conditions in the catalyst bed were maintained at about 527° C. and 6 psig. Octane feed rate was 250 cc/hr giving a WHSV of about 700 $hr^{-1}$ based on the ZSM-5. Residence time was about 0.1 second.

The reactor was operated for 1 hour between regenerations. Regeneration consisted of feeding 5% $O_2$ for 28 minutes and full air for 28 minutes followed by 4 minutes of nitrogen purge.

Octane conversion was 22%, and the wt. % selectivities achieved on a hydrogen-free and coke-free basis were:

| | |
|---|---|
| Methane | 0.4 |
| Ethylene | 4.59 |
| Ethane | 2.03 |
| Propylene | 15.55 |
| Propane | 9.95 |
| Butenes | 21.89 |
| Butanes | 16.14 |
| Pentenes | 9.77 |
| Pentanes | 6.36 |
| $C_6$'s | 3.46 |
| $C_7$'s | 2.93 |
| $C_9^+$ | 6.94 |

EXAMPLE 1

Comparative Example A was repeated except that, pursuant to the instant invention, an equal volume of the $C_4^+$ reaction products (containing unreacted octane and olefins) was continuously recycled to the reaction and combined wth the fresh octane feed. The combined feed contained 2.4 wt. % propylene and 7.2 wt. % $C_4$ plus $C_5$ olefins. The n-octane concentration in the combined feed was 85 wt. %. Residence time was 0.05 second. The WHSV including the recycle was about 1400 $hr^{-1}$.

Overall octane conversion was 31% and overall wt. % selectivities on a hydrogen-free and coke-free basis were:

| | |
|---|---|
| Methane | 0.59 |
| Ethylene | 6.32 |
| Ethane | 2.55 |
| Propylene | 27.88 |
| Propane | 14.90 |
| Butenes | 21.34 |
| Butanes | 6.86 |
| Pentenes | 5.66 |
| Pentanes | 4.70 |
| $C_6$'s | 2.28 |
| $C_7$'s | 2.06 |
| $C_9^+$ | 3.96 |

It will be seen from a comparison of Example 1 and Comparative Example A that practice of the invention dramatically improved overall octane conversion as well as overall propylene selectivity. The butane and pentane selectivities were sharply reduced.

COMPARATIVE EXAMPLE B

Comparative Example A was repeated except that the feed was cis/trans butene-2 rather than n-octane.

Butene conversion was 65% and the wt. % selectivities on a hydrogen-free and coke-free basis were:

| | |
|---|---|
| Methane | 0.05 |
| Ethylene | 4.26 |
| Ethane | 0.12 |
| Propylene | 29.55 |
| Propane | 3.20 |
| Butanes | 6.56 |
| $C_5^-$ | 56.26 | this Comparative Example B demonstrates about the same selectivity to propylene as Example 1 and illustrates that surprisingly both saturated hydrocarbons and olefins are converted to propylene with good efficiency at the same reaction conditions.

COMPARATIVE EXAMPLE C

A full range naptha ($C_5$ to $C_{12}$), condensed from an Algerian natural gas well, was fed to a steam cracker at an 0.75 steam to oil ratio. The weight % yields are shown below at the indicated coil temperatures:

| Coil Outlet Temp. °C. | 815 | 849 |
|---|---|---|
| Yields, wt % | | |
| Hydrogen | 0.8 | 1.0 |
| Methane | 12.8 | 16.5 |
| Acetylene | 0.3 | 0.6 |
| Ethylene | 25.0 | 30.0 |
| Ethane | 3.7 | 3.4 |
| Methylacetylene/Propadiene | 0.6 | 0.7 |
| Propylene | 16.9 | 12.1 |
| Propane | 0.7 | 0.5 |
| Butenes | 5.7 | 3.2 |
| Butanes | 1.1 | 0.4 |
| Butadiene | 4.6 | 3.9 |
| $C_5$'s | 5.4 | 3.2 |
| Benzene | 6.6 | 9.1 |
| Toluene | 3.7 | 4.1 |
| $C_8$ Aromatics | 2.5 | 2.7 |
| $C_6$ to $C_8$ Non-aromatics | 4.1 | 1.0 |
| $C_9^+$ | 5.5 | 7.5 |

COMPARATIVE EXAMPLE D 0.15 grams of ZSM-5 catalyst, 100×140 mesh was mixed with 4.5 grams of Alcoa T-64 alpha alumina and loaded into the reactor of Example A. The reactor was heated with an electric tube furnace. Temperatures in the catalyst bed were measured with an axial thermowell. Algerian condensate as in Example C was pumped into the top of the reactor at the rate of 60 cc/hr. The catalyst bed was maintained at 621° C. and 0 5 psig. The gas and liquid reaction products were analyzed and the results are shown below:

| Overall conversion, % | 54 |
|---|---|
| Yield, Wt % | |
| Methane | 3.8 |
| Ethylene | 9.8 |
| Ethane | 3.5 |
| Propylene | 18.3 |
| Propane | 2.3 |
| Butenes | 8.2 |

| -continued | |
|---|---|
| Overall conversion, % | 54 |
| Butane | 4.3 |
| Butadiene | 0.2 |
| $C_5$ olefins | 2.5 |
| $C_5$ paraffins | 1.1 |
| $C_6^+$ aromatics | 3.3 |
| $C_6^+$ paraffins (unreacted feed) | 42.7 |

EXAMPLE 2

The process of the present invention was carried out using the Algerian condensate also used in Comparative Examples C and D. Conditions of the reaction were the same as those in Comparative Example D. In carrying out the process, effluent from the reactor was distilled to separate a $C_3$ and lighter product stream from a $C_4$ and heavier stream which was recycled. The volume ratio of fresh feed to recycle was varied. The results achieved are as follows:

| | Recycle Ratio | | |
|---|---|---|---|
| Recycle/Fresh Feed | 1.0 | 2.0 | 4.0 |
| Overall Yields, wt % (based on fresh feed) | | | |
| Methane | 6.1 | 6.7 | 7.0 |
| Ethylene | 16.3 | 18.2 | 19.2 |
| Ethane | 5.6 | 6.1 | 6.4 |
| Propylene | 32.9 | 37.5 | 40.1 |
| Propane | 3.9 | 4.3 | 4.6 |
| Butanes | 7.3 | 8.2 | 8.8 |
| Butenes | 4.6 | 2.5 | 1.2 |
| $C_5^+$ | 23.3 | 16.5 | 12.7 |

As shown in Comparative Example C, steam cracking is capable of a 17% propylene yield and this will not increase beyond 20% with recycle because the once through $C_4^+$ cracking products are not well suited for making propylene. Through practice of the present invention, propylene yields as high as 40% can be achieved thus demonstrating the surprising superiority of the invention.

COMPARATIVE EXMAPLE E 10.0 grams of Intercat Zcat-plus, 40×60 mesh, was loaded into a ¾" ID Alumina tube. The catalyst bed was supported with a ½" OD alumina tube from the bottom. A layer of Denstone 57 inert spheres was placed on top. The ceramic tube was placed inside a 1.8" OD stainless steel shield. The entire assembly was mounted in an electric tube furnace. 93 gm/hr of n-butane and 6 gm/hr of distilled water were fed to the catalyst bed, which was maintained at about 593° C. and 1 psig. After 30 minutes the butane feed was stopped and the catalyst bed was regenerated using air, steam and nitrogen. The regeneration was conducted for 30 minutes also. Following this, the reaction-regeneration cycle would repeat indefinitely, until steady state was searched. When steady state was reached, the following data were obtained:

| Conversion of N-butane, % | 7.2 | 10.9 |
|---|---|---|
| Selectivity, wt % | | |
| Methane | 14.05 | 15.90 |
| Ethylene | 15.66 | 19.14 |
| Ethane | 12.51 | 10.23 |
| Propylene | 38.35 | 40.72 |
| Propane | 1.21 | 1.62 |
| Butanes | 16.12 | 9.54 |
| Isobutane | 0.80 | 0.24 |
| Pentenes | 0.0 | 0.93 |
| Pentanes | 0.0 | 0.0 |
| $C_6^+$ | 0.25 | 0.79 |

COMPARATIVE EXAMPLE F

The procedure of Example E above was repeated, except the temperature was raised to 635° C. and the feed was changed to isobutane.

| Conversion of Isobutane, % | 16.1 |
|---|---|
| Selectivity, wt % | |
| Methane | 12.6 |
| Ethylene | 3.7 |
| Ethane | 0.26 |
| Propylene | 34.13 |
| Propane | 1.95 |
| n-butane | 1.38 |
| Butenes | 39.21 |
| $C_5^+$ | 6.77 |

EXAMPLE 3

Using the same procedure as Example E, gasoline hydrocarbon mixture was fed to the catalyst bed at a rate of 108 grams per hour. The temperature and pressure in the catalyst bed were maintained at 593° C. and 2 psig, respectively. The feed, analyzed by FIA and GC had the following composition:

| Olefins | 10.5 vol % | Isobutane | 3.6 Wt % |
|---|---|---|---|
| Saturates | 61.0% | N-butane | 5.6% |
| Aromatics | 28.5% | Pentanes | 15.3% |

At steady state, the overall conversion was 20.3%. The component selectivities and conversions are presented below:

| | Selectivity, wt % | Component Conversion |
|---|---|---|
| $H_2$ + Coke | 1.44 | |
| Methane | 3.68 | |
| Ethylene | 16.20 | |
| Ethane | 2.97 | |
| Propylene | 42.02 | |
| Propane | 2.67 | |
| Isobutane | | 32.3 |
| BD | 0.24 | |
| N-butane | | 21.9 |
| Butenes | 12.32 | |
| Pentenes | | 62.4 |
| Pentanes | | 19.4 |
| $C_6$'s | | 33.2 |
| Benzene | 5.44 | |
| $C_7$'s | | 36.7 |
| Toluene | 7.23 | |
| $C_8$ Non-Aromatics | | 21.7 |
| $C_8$ Aromatics | 4.28 | |
| $C_9^+$ | 1.52 | |

Comparing Example 3 with Examples E and F indicates that the conversions of N-butane and isobutane are doubled in the presence of olefins.

EXAMPLE 4

A $C_4$–$C_6$ cut was taken from an FCC unit and reacted using the same procedure as Example E. The olefin concentration in this stream was 55 wt %. The balance was paraffins, including 17.1 wt % isobutane and 7.6 wt % n-butane. 100 gm/hr of this mixture was fed to the catalyst bed, which was held at 593° C. and 1 psig. The results are summarized below:

| | Overall Conversion: 34% | |
|---|---|---|
| | Selectivity, wt % | Component Conversion, % |
| Methane | 1.51 | |
| Ethylene | 16.04 | |
| Ethane | 0.60 | |
| Propylene | 53.22 | |
| Propane | 2.10 | |
| Isobutane | | 25.5 |
| BD | | 59.3 |
| N-butane | | 3.2 |
| Butenes | | 46.0 |
| Pentenes | | 59.2 |
| Pentanes | 14.36 | |
| $C_6$'s | | 35.0 |
| benzene | 1.84 | |
| $C_7$'s | 2.86 | |
| Toluene | 4.10 | |
| $C_8{}^+$ | 3.18 | |

The isobutane conversion here is nerely double that of Example E, in spite of the lower temperature and lower isobutane concentration. This suggests olefins in the feed are increasing the rate of paraffin consumption.

COMPARATIVE EXAMPLE G

BT Raffinate, containing the components listed below, was reacted according to the procedure of Example E at feed rate of 210 gm/hr:

| | Feed, wt % |
|---|---|
| Butenes | 0.19 |
| Pentenes | 0.21 |
| Pentanes | 5.91 |
| Hexanes | 65.88 |
| Benzene | 1.51 |
| Hextanes | 19.20 |
| Toluene | 2.10 |
| $C_8{}^+$ | 3.00 |

The total olefin content of this stream is 0.4 wt %. The catalyst bed was maintained at 538° C. and 9 psig. The results are shown below:

| | Selectivity, wt % | Component Conversion, % |
|---|---|---|
| Coke + $H_2$ | 1.25 | |
| Methane | 2.82 | |
| Ethylene | 7.84 | |
| Ethane | 3.35 | |
| Propylene | 38.05 | |
| Propane | 4.45 | |
| Butenes | 28.65 | |
| Butanes | 1.40 | |
| Pentenes | 7.80 | |
| Pentanes | | 2.99 |
| Hexanes | | 15.04 |
| Benzene | 1.53 | |
| Hextanes | | 18.73 |
| Toluene | | 1.71 |
| $C_8{}^+$ | 2.87 | |

The relative conversions of $C_5$, $C_6$ and $C_7$ paraffins are not surprising, since reactivity increases with molecular weight.

EXAMPLE 5

According to the ivnetnion, a $C_4$-$C_6$ cut containing 55 wt % olefins was taken from an FCC unit and fed according to the procedure of Example E at the rate of 195 gm/hr. The composition of the stream is presented below:

| | Feed, wt % |
|---|---|
| Propylene | 0.10 |
| Propane | 0.14 |
| Isobutane | 17.11 |
| N-butane | 7.60 |
| Butenes | 39.23 |
| Pentenes | 16.36 |
| Pentanes | 13.80 |
| $C_6{}^+$ | 5.66 |

The catalyst bed was maintained at 538° C. and 9 psig. The $C_3$ and lighter portion of the reactor effluent was separated by continuous fractionation and removed as product. The $C_4{}^+$ portion of the effluent was recycled back to the reactor inlet at a rate of 256 gm/hr and mixed with the fresh feed prior to contact with the catalyst bed, bringing the total feed rate to 451 gm/hr. The composition of the combined feed is shown below:

| | Feed, wt. % |
|---|---|
| Propylene | 1.61 |
| Propane | 0.06 |
| Isobutane | 13.25 |
| N-butane | 7.59 |
| Butenes | 26.39 |
| Pentenes | 21.49 |
| Pentanes | 15.27 |
| $C_6{}^+$ | 14.34 |

The total concentration of olefins in the reactor feed was 49.5 wt %.

The overall conversion of the fresh feed was 32%. The overall selectivities and component conversions are shown below:

| | Overall Selectivity, wt % | Overall Conversion % |
|---|---|---|
| Methane | 0.26 | |
| Ethylene | 11.05 | |
| Ethane | 0.23 | |
| Propylene | 75.09 | |
| Propane | 1.83 | |
| Isobutane | | 6.35 |
| N-butane | | 3.65 |
| Butenes | | 56.03 |
| Pentenes | | 26.53 |
| Pentanes | | 29.56 |
| $C_6{}^+$ | 11.43 | |

Comparing Exmaple G with Example 5 shows the increase in C5 paraffin conversion resulting from the presence of olefins in the feed. It is surprising that the $C_5$ paraffin conversion in Example 5 is ten times higher than Example G, in spite of the fact that the space velocity is twice as high. This result shows the beneficial effect of olefins on the conversion of paraffins.

EXAMPLE H

The procedure of Example E was repeated, except the feed was isobutane, the temperature was raised to 635° C. and the pressure was raised to 12 psig.

| | |
|---|---|
| Conversion of Isobutane, % | 23.7 |
| Selectivity, wt % | |
| Methane | 12.47 |
| Ethylene | 8.03 |
| Ethane | 0.62 |
| Propylene | 35.83 |
| Propane | 4.26 |
| N-butane | 1.77 |
| Butenes | 29.02 |
| $C_5{}^+$ | 5.96 |

EXAMPLE 6

Example 4 was repeated, except at 12 psig pressure. The overall conversion was 42.3%.

| | Selectivity, wt % | Component Conversion, % |
|---|---|---|
| Methane | 7.9 | |
| Ethylene | 18.8 | |
| Ethane | 2.6 | |
| Propylene | 51.4 | |
| Propane | 4.6 | |
| Isobutane | | 33.1 |
| BD | | 57.8 |
| N-butane | 13.5 | |
| Butenes | | 61.8 |
| Pentenes | | 65.7 |
| Pentanes | 2.8 | |
| $C_6{}^+$ | 11.4 | |

A comparison of Example 6 with example H shows that the isobutane conversion in Example 6 is measurably higher even though the temperature was 24° C. lower. This is due to the olefins present in the feed to Example 6.

Saturated paraffin hydrocarbons used as feed in accordance with the ivnention are those having 4 or more carbon atoms, especialy $C_5$-$C_{20}$. Individual hydrocarbons or mixtures can be employed. Preferred hydrocarbons are those having from about 6 to 20 carbons, especially petroleum fractions for reasons of costs. Specific hydrocarbons include hexane, the methyl pentanes, cetane, etc.

The conversion is carried out at elevated temperatures in the range of about 400° to 800° C., preferably 500° to 700° C.

Low hydrocarbon partial pressures and low conversions per pass favor propylene production. The feed hydrocarbon can be admixed with steam or inert gas such as nitrogen. The hydrocarbon partial pressure is as low as practical, illustratively 1 to 30 psia. Where no diluents are employed, system pressures ranging from about −12 to 50 psig, preferably −5 to 30 psig are suitable. Higher pressures can be used when diluents are employed.

High space velocity and short residence times are preferred in order to maintain the desired low conversions per pass. Paraffin hydrocarbon conversions per pass are less than 50%. Space velocities depend on the particular zeolite used and are 1 to 5000 preferably 5 to 2000 hr$^{-1}$ WHSV. Reactor residence times are 0.001 to 20 seconds, preferably 0.01 to 5 seconds.

The conversion reaction of the instant invention is highly endothermic. Preferably fluidized solid catalyst conversion procedures are used with the feed hydrocarbon vapor contacting fluidized particles of the zeolite catalyst Heat necessary to maintain the reaction is provided by separately heating the catalyst particles in a fluidized regeneration zone as by combustion of appropriate fuel hydrocarbon.

Fixed bed procedures can be employed. In such cases, the use of reaction zones in series with interstage heating is advantageous.

Zeolite catalysts used in the invention can be silaceous, crystalline molecular sieves. Such silica containing crystalline materials include materials which contain, in addition to silica, significant amounts of alumina. These crystalline materials are frequently named "zeolites, i.e., crystalline aluminosilicates. Silica containing crystalline materials also include essentially aluminum-free silicates. These crystalline materials are exemplified by crystalline silica polymorphs (e.g., silicalite, disclosed in U.S. Pat. No. 4,061,724 and organosilicates, disclosed in U.S. Pat. No. Re. 29948), chromia silicates (e.g., CZM), ferrosilicates and galliosilicates (see U.S. Pat. No. 4,238,318), and borosilicates (see U.S. Pat. Nos. 4,226,420; 4,269,813; and 4,327,236).

Crystalline aluminosilicate zeolites are best exemplified by ZSM-5 (see U.S. Pat. Nos. 3,702,886 and 3,770,614), ZSM-11 (see U.S. Pat. No. 3,709,979), ZSM-12 (see U.S. Pat. No. 3,832,449), ZSM-21 and ZSM-38 (see U.S. Pat. No. 3,948,758), ZSM-23 (see U.S. Pat. No. 4,076,842), and ZSM-35 (see U.S. Pat. No. 4,016,246).

Phosphorous containing zeolites are suitably used (see U.S. Pat. 3,972,832) and in such cases it is especially advantageous to add steam to the feed mixture.

Acid aeolites are especially preferred, particularly the ZSM type and borosilicates. ZSM-5 is especially useful.

In addition to the above, zeolite containing materials can be used. Representative of such materials are zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), synthetic mordenite, and dealuminized mordenite, as well as naturally occurring zeolites, including chabazite, faujasite, mordenite, and the like.

In general, the zeolites are ordinarily ion exchanged with a desired cation to replace alkali metal present in the zeolite as found naturally or as synthetically prepared. The exchange treatment is such as to reduce the alkali metal content of the final catalyst to less than about 1.5 weight percent, and preferably less than about 0.5 weight percent. Preferred exchanging cations are hydrogen, ammonium, rare earth metals and mixtures thereof, with particular preference being accorded rare earth metals. Ion exchange is suitably accomplished by conventiona contact of the zeolite with a suitable salt solution of the desired cation, such as, for example, the sulfate, chloride or nitrate salts.

It is preferred to have the crystalline zeolite of a suitable matrix, since the catalyst form is generally characterized by a high resistance to attrition, high activity and exceptional steam stability. Such catalysts are readily prepared by dispersing the crystalline zeolite in a suitable siliceous sol and gelling the sol by various means. The inorganic oxide which serves as the matrix in which the above crystalline zeolite is distributed includes silica gel or a cogel of silica and a suitable metal oxide Representative cogels include silica-aluminia, silica-magnesia, silica-zirconia, silica-thoria, silica-beryllia, silica-titania, as well as ternary combinations, such as silica-alumina-magnesia, silica-aluminia-zirconia and silica-magnesia-zirconia. Preferred cogels include silica-alumina, silica-zirconia or silica-alumina-zirconia. The above gels and cogels will generally comprise a major proportion of silica and a minor proportion of the other aforementioned oxide or oxides. Thus, the silica content of the siliceous gel or cogel matrix will generally fall within the range of 55 to 100 weight percent, preferably 60 to 95 weight percent, and the other metal oxide or oxides content will generally be within the range of 0 to 45 weight percent, and preferably 5 to 40 weight percent. In addition to the above, the matrix may also comprise natural or synthetic clays, such as kaolin type clays, montmorillonite, bentonite or halloysite. These clays may be used either alone or in combination with silica or any of the above specified cogels in a matrix formulation.

What is claimed is:

1. The method of preparing $C_2$–$C_3$ olefins from a paraffin hydrocarbon feedstock which comprises:
    a) forming a mixture of 40 to 95 wt % paraffin hydrocarbons having 4 or more carbon atoms and 5 to 60 wt % olefins having 4 or more carbon atoms, and feeding said mixture to a reaction zone containing a catalyst consisting essentially of a zeolite,
    b) contacting said mixture with said catalyst at reaction conditions favoring conversion of said mixed stream to propylene, said conditions including a reaction temperature in the range 500–700° C., a hydrocarbon partial pressure in the range of 1 to 30 psia and a paraffin hydrocarbon conversion per pass of less than 50%, and
    c) separating product $C_2$–$C_3$ olefins from the reaction mixture.

2. The method of claim 1 wherein the paraffin hydrocarbon feedstock is a $C_5$ to $C_{20}$ paraffin hydrocarbon or hydrocarbon mixture.

3. The method of claim 1 wheein the zeolite catalyst is ZSM-5.

4. The method of preparing $C_2$–$C_3$ olefins from a paraffin hydrocarbon feedstock which comprises:
    a) forming a mixture of 40 to 95 wt % paraffin hydrocarbons having 4 or more carbon atoms and 5 to 60 wt % olefins having 4 or more carbon atoms, and feeding said mixture to a reaction zone containing a catalyst consisting essentially of a zeolite,
    b) contacting said mixture with said catalyst at reaction conditions favoring conversion of said mixed stream to propylene, said conditions including a reaction temperature in the range 500–700° C., a hydrocarbon partial pressure in the range of 1 to 30 psia and a paraffin hydrocarbon conversion per pass of less than 50%,
    c) separating product $C_2$–$C_3$ olefins from the reaction mixture, and
    d) recycling unreacted paraffin hydrocarbon and olefins formed in step b) and having 4 or more carbon atoms to step a).

* * * * *